(12) United States Patent
Apple et al.

(10) Patent No.: US 8,050,393 B2
(45) Date of Patent: Nov. 1, 2011

(54) METHOD AND APPARATUS FOR EVALUATING POSSIBLE 3-WAY CALL EVENTS

(75) Inventors: Wesley Larry Apple, Elon, NC (US); Sam Burris Clanton, III, High Point, NC (US); Timothy Edwin Pabon, Greensboro, NC (US); William Ryan, Greensboro, NC (US); John Vincent Townsend, III, Kernersville, NC (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 849 days.

(21) Appl. No.: 12/151,321

(22) Filed: May 5, 2008

(65) Prior Publication Data

US 2009/0067604 A1   Mar. 12, 2009

Related U.S. Application Data

(60) Provisional application No. 60/927,645, filed on May 4, 2007, provisional application No. 61/065,991, filed on Feb. 15, 2008.

(51) Int. Cl.
*H04M 15/00* (2006.01)
(52) U.S. Cl. .............................. 379/114.14; 379/142.05
(58) Field of Classification Search ............... 379/27.02, 379/85, 114.14, 114.21, 114.23, 114.01, 379/142.05, 142.18
See application file for complete search history.

(56) References Cited

U.S. PATENT DOCUMENTS

| 7,751,547 B2 * | 7/2010 | Kappes et al. | 379/211.02 |
| 2006/0291640 A1 * | 12/2006 | Nagesh et al. | 379/211.02 |
| 2009/0067604 A1 * | 3/2009 | Apple et al. | 379/207.04 |

* cited by examiner

*Primary Examiner* — Creighton Smith
(74) *Attorney, Agent, or Firm* — Kilpatrick Townsend & Stockton, LLP

(57) ABSTRACT

The likelihood that a called party to a telephone call has forwarded the call to another party, or has conferenced the call to include another party is estimated by requiring that the called party supply a first signal, illustratively a first DTMF signal, later requiring that the called party provide a second signal, illustratively the same DTMF signal provided by the first signal, and comparing characteristics of said first and second signals as received at a telephone network node.

6 Claims, 6 Drawing Sheets

METHOD AND APPARATUS FOR EVALUATING POSSIBLE 3-WAY CALL EVENTS

RELATED APPLICATIONS

The present application claims priority based on these related U.S. patent applications:

1. Telephony System and Method with Enhanced Fraud Control, by W. L. Apple and T. E. Pabon, filed Sep. 2, 2005;
2. IP-Network-Based Telephony System and Method, by W. L. Apple, and T. E. Pabon, filed Sep. 2, 2005;
3. Telephony System and Method with Enhanced Validation, by W. L. Apple, T. E. Pabon and J. V. Townsend, filed Sep. 2, 2005;
4. Telephony System and Method with Enhanced Caller Access Control, by W. L. Apple and T. E. Pabon, filed Sep. 2, 2005;
5. Telephony System and Method with Improved Fraud Control, by W. L. Apple, K. J. Gumbiner, T. E. Pabon, and W. Ryan, filed Sep. 2, 2005.
6. Provisional application 60/927,645 filed May 4, 2007 by W. L. Apple, S. B. Clanton, T. E. Pabon, W. Ryan, and J. V., Townsend III; and
7. Provisional application 61/065,991, filed Feb. 15, 2008 by W. Ryan.

Each of these related applications is hereby incorporated by reference for all purposes in the present application as if set forth in its entirety herein. For convenience and brevity, references to these incorporated applications will be by way of the number prefix for each cite, e.g., "incorporated patent application 5" will be understood to refer to the application entitled Telephony System and Method with Improved Fraud Control.

FIELD OF THE INVENTION

The present invention relates to telecommunication monitoring and recording methods and systems. More particularly, the present invention relates to such methods and systems for selectively monitoring and recording Dual Tone Multi-Frequency (DTMF) signals appearing in telecommunications systems. Still more particularly, the present invention relates to such methods and systems for selectively monitoring DTMF signals appearing in telecommunications systems that are generated during an ongoing call in response to a request to generate specified signals by depressing one or more identified keys. The present invention also provides for terminating or otherwise treating calls on which received DTMF signals fail to adequately match previously received DTMF signals.

BACKGROUND OF THE INVENTION

DTMF signaling has long been used to communicate between telephone terminal equipment and network infrastructure, recording devices, other terminal equipment, and many other kinds of devices. Each key on a typical telephone station keypad dialer, usually corresponding to one of the digits 0 through 9 and star (*) and pound (#) symbols, is used to generate signals with a distinct pair of frequencies (a dual tone) that can be decoded to retrieve keyed digits and symbols. For simplicity, the digits and symbols selectable from a standard telephone keypad will be collectively referred to in this application as DTMF digits unless a distinction is necessary. A primary use of such keypads, DTMF digits, and associated tone pairs, has been to signal telephone digits to a telephone company central office when placing ("dialing") a telephone call from one of a wide variety of telephone station sets. As is well known, telephone numbers for telephone station sets typically comprise a sequence of seven- or ten-digits, with appropriate prefix and or suffix sequences to select particular services or to select other particular options. Of course, any number of digits can be used in particular calling sessions if mutually understood in the particular network.

Uses of keypads on telephone sets and other DTMF signaling equipment, including communication equipment embedded in network infrastructure, have come to be used for other than telephone station selection ("dialing"). Thus, for example, telephone calling card numbers and Personal Identification Numbers (PINs) are frequently entered using a telephone keypad to signal to remote network infrastructure using DTMF signaling. Telephone, or computer keypads or keyboards, are also used to send DTMF digits for many non-telephone applications, including entering information into Automated Teller Machines (ATMs) or other banking of devices, menu selection at Internet web sites and innumerable others. One important use of DTMF signaling is to indicate assent on the part of a called party to having a received collect call charged to the called telephone station account—popularly, accepting charges for a collect call.

Telephone calls made by inmates in jails, prisons and other custodial institutions are usually processed using so-called Inmate Calling Services (ICSs). A provider of such services may also be called an Inmate Calling Service, but will here be distinguished, when appropriate, by using the term ICS provider. An ICS provider typically employs a variety of processors, databases and other equipment elements individually well known in the art in a system (here referred to as an ICS System or ICS infrastructure) to perform the many functions involved in ICSs. Particular functions, such as call control, three-way call treatment (discussed below) and many others are typically configured and performed under stored program control of such ICS systems.

Custodial institutional regulations typically limit calls from an inmate to only those to specific authorized called parties. Usually, a list or computer database is consulted in response to a call request made by an inmate presenting a called party telephone number to determine whether the requested call is to an authorized called party. Such databases provide a called number validation or screening to prevent harassing calls from being made to, for example, police or other government officials, or to seek to prevent conversations relating to criminal activity, among other reasons. Of course, efforts are made to prevent calls to those who have indicated an unwillingness to receive calls from an inmate caller.

Modern technology has provided ample means for inmates and their accomplices to seek to circumvent call destination (called number) limitations. Thus, for example, so-called three-way (3-way) calls may be attempted by seeking to bridge (or conference) an existing (2-way) first call that has been completed from an inmate to an otherwise authorized called party with a second call from the authorized called party to an unauthorized second called party. In particular cases, the first called party may retain a presence on these bridged first and second calls, or the first called party may hang up the first call. In the latter case, the call from the inmate will effectively have been forwarded to the second unauthorized called party.

Many schemes have been devised by enterprising inmates and their non-inmate collaborators to have a call to an authorized called party routinely forwarded to a third party who, in many cases, may be an unauthorized called party. It should be noted, however, that some three-way or conference calls may be authorized, as in the case where a family member and an attorney for a calling inmate may be permitted. In such cases, however, it is important that the ICS provider, in keeping with institutional regulations, provide control over who may be connected in such authorized conference calls. Incorporated patent application 5 is directed, in part, to techniques for affording ICS providers with improved control over participation in calls involving inmate callers.

Different versions of bridging or conferencing of telephone calls by local and long distance telephone companies provide their subscribers with different particular connections or sets of connections to continue after the completion of the first call. For example, bridging may be accomplished by the called party to the first call using a second telephone line at the station set of that first called party to reach (and bridge or conference) the unauthorized second called party. The terms bridge and conference will be used interchangeably in this application unless a distinction is required by a particular context. It is noted, however, that some practitioners in the telecommunications arts seek to distinguish extending a call to a third party solely through a telephone company central office, or the equivalent, from a bridge established at a (first) called party station. Call forwarding likewise has several different implementations. Some of these implementations, commonly provided as a local (or other) telephone company service, involve behavior, such as keying in a prefix or code (such as 72*) followed by the forwarded-to number. Moreover, such activation of call forwarding on a telephone line (associated with a subscriber number or account) can often be performed remotely from anywhere a DTMF telephone can be used to place a call to the telephone company providing such remote call forwarding service. Typically, call forwarding by a local telephone provider will, once activated by a first code will remain active until deactivated by an authorized person, such as the account owner. For simplicity in the sequel, all calls involving bridging, conferencing or forwarding of calls to unauthorized parties will be referred to as unauthorized 3-way calls, or simply 3-way calls—and the actions seeking to establish or maintain such calls as 3-way calling.

ICS providers use specialized call handling equipment to process a request for a call by an inmate to a called party identified by the inmate by temporarily connecting the calling party to ICS infrastructure equipment—effectively placing the calling party on hold. This on-hold condition persists until the called party is available to be connected (bridged) with a connection from the ICS infrastructure to the called party.

Since many, if not most calls by inmates using an ICS are collect calls, use of DTMF to indicate willingness of a called party to pay for a received call from an inmate is quite common. In typical practice, recorded voice prompts are played when a called party answers a call from an inmate, but before the inmate is bridged to the connection to the authorized called party. This voice prompt will indicate the nature of the call and the identification of the calling party, and will require that the called party depress one or more identified keys on his/her telephone keypad, e.g., "Please press the three key if you agree to have this call charged to your telephone account." Then, receipt by the ICS provider of the DTMF tones associated with the requested digit or digits, e.g., the "3," is taken as assent by the called party to have the call charged to his or her account. Generally, if such assent to being charged for the collect call is not received in due course by the ICS provider, the call will be terminated. Alternatively, the voice prompt will be repeated, other voice prompts will be delivered to the called party, or other communication will ensue between the ICS provider and the called party until agreement to pay for the call is received or the call is terminated.

When the called party agrees to have the incoming collect call charged to his/her account, the connection from the calling inmate to ICS infrastructure is bridged to the connection from the ICS provider to the called party. In typical practice, ICS equipment will record and a confinement officer may monitor some or all of: the call request by the inmate, the voice announcements and prompt(s) from the ICS provider to the called party, the called party responses (including DTMF signals received by the ICS provider). As well, as the bridged telephone connection between the calling inmate and the called party that occurs after acceptance of charges by the called party will typically be monitored and/or recorded. Of course, any subsequent bridging or forwarding of connections to include the calling party and other than the original called party will typically be monitored and/or recorded. Though the totality of the call activity for each particular inmate-originated call will typically be recorded, the degree and kind of active monitoring (human and/or machine) may vary during the course of a call. However, an ICS provider actively maintains some presence on each on-going call, and the call participants are made aware of such presence.

Because certain signals appear on a telephone connection involving a station seeking to bridge or conference a third party to an existing call completed from an inmate to an authorized called party, attempts to thwart, or at least detect, unauthorized 3-way calling have tended to focus on detecting signals arising from activities by the authorized called party in attempting to establish a 3-way call. Thus, in particular, monitoring of line signals during an on-going connection for the presence of so-called hook-flash signals used by some telephone companies in providing conferencing or call forwarding has been employed. In other attempts at 3-way call detection, other particular telephone line signal characteristics have been monitored, such as background noise levels, call progress tones, echoes and many others. However, because communications networks are subject to a variable array of noise conditions, echoes and other impairments, and because monitoring equipment and software often prove inadequate to their task of identifying unauthorized calling, and for other reasons, prior 3-way call detection efforts have proven largely unsatisfactory. Further, it has proven costly in terms of processing resources needed for continued monitoring of an on-going call for any of a large number of signal conditions possibly indicative of 3-way call attempts. The incidence of false-positive indications of 3-way call attempts has likewise resulted in the inconvenience of unnecessary call interruptions and terminations, and consequent loss of revenue for ICS providers.

DTMF signal monitoring has been used to identify signal condition involved in establishing a 3-way call, but such DTMF monitoring has typically been in the form of detecting the number of DTMF digits keyed by a called party after an otherwise authorized call has been in progress. Thus, detection of more than a predetermined number DTMF digits has, in some cases, been deemed to be indicative of the placing of an unauthorized 3-way call by an authorized called party. (In confinement institutions it proves relatively simple to prevent the generation of DTMF signals by an inmate by merely disabling the institutional keypad after initial call set-up information has been entered.)

However, because keyed DTMF digits are now being used for a variety of allowable purposes after a call is connected, voice and other signals on the line will be present on a connection while the DTMF detector is active. Indeed, some monitoring or other voice processing applications require a DTMF detector to be capable of recognizing DTMF tones simultaneously with an ongoing voice conversation, while recording a message, playing a message or at other times. For such applications, a DTMF detector must be capable of interpreting received tones in a reliable manner, even when these tones are significantly degraded when compared to DTMF tones transmitted from user equipment to a DTMF detector located in a local telephone central office. If the DTMF detector mistakes speech from an outgoing recording from a voice processing system or a speech signal present on the line as a valid DTMF tone, a monitoring system may enter some undesired mode, resulting in system failure. Mistakes of this type are more common because particular received DTMF tones are not always known in advance or expected, nor is the time of arrival for such tones known.

Importantly, as described in incorporated patent application 7, inadvertent depression of one or more keypad digits can result in a false determination that a 3-way call attempt has been made or is in progress.

It is therefore desired that the ubiquity of DTMF signaling be exploited in 3-way call detection while avoiding shortcomings of prior art 3-way call detection techniques.

SUMMARY OF THE INVENTION

The limitations of the prior art are overcome and a technical advance is made in accordance with the present invention, detailed embodiments of which are presented in the following detailed description.

In accordance with one aspect of illustrative embodiments of the present invention, possible 3-way call attempt detection is accomplished in an ICS context by determining signal characteristics of a first DTMF signal received from an authorized called telephone station and comparing such first DTMF signal characteristics with signal characteristics of a second, subsequent, DTMF signal received on the channel connection to the authorized called party. Such second DTMF signal is illustratively received in response to a request sent by the ICS provider on the connection to the authorized called party to an on-going call to key a sequence of one or more particular digits. Advantageously, one or more of the requested digits is/are the same as the digit or digits previously keyed by the authorized called party.

One particular first DTMF signal that proves useful in the present invention is that generated by an authorized called party to an ICS call when assenting to acceptance of charges for an incoming ICS call in response to an audio message from the ICS system. This first signal may be generated by depressing a key for a single digit, such as a 3, or may be generated by depressing more than one key in succession, such as 3, 6, or *, 3, or any other sequence of one or more digits. Recall that digit, as used here, also refers to the * and # keys, and the symbols and tone pairs associated with those keys.

As is usual for ICS calls, first DTMF signal digits received by the ICS system are recognized for purposes of determining the willingness of the called party to accept charges for the call and the charge acceptance transaction is monitored and/or recorded in the fashion common to ICS calls. If the digit(s) received correspond to the requested indication that the called party will accept charges, bridging is performed for the two links to the call, i.e., between the ICS system infrastructure and both of the calling and called party stations, respectively.

In addition, in accordance with a feature of illustrative embodiments of the present invention, the received first signal is analyzed by the ICS system in respect of selected ones of its signal characteristics. These characteristics are selected from a set of signal characteristics that may include power or amplitude of received digit tone components (or total received power), phase characteristics of such tone components, relative delay characteristics of tone components and others to be described below. It should be understood that analyses of received first signals is in addition to, and may be separate from the usual analysis to determine the identity of received digit(s), e.g., a 3 digit. One or more of the signal characteristics of the received first DTMF signal (or derived, at least in part, from received first DTMF signals) may, however, be used in establishing the identity of received digits.

It proves advantageous that at least the talking path (and the keypad at the calling inmate location) be disconnected from the bridged call and placed on hold while the called party is responding to the request for second signals. This will prevent inputs from the calling inmate to the evaluation of responses from the authorized called party.

Illustrative second received DTMF signals will advantageously include those resulting from the keying of DTMF digits in response to a recorded voice message (or prompt) from the ICS system after bridging a call from an inmate and an authorized called party. It proves advantageous in some circumstances to provide more than a single second signal, i.e., it may be desirable to prompt for more than one keyed response subsequent to establishing a connection to an authorized called party. These prompts for, and receipt by the ICS system of, one or more second signals received by an ICS system may occur periodically, randomly, upon the occurrence of some call event, or when the call exceeds some duration or other call parameter or condition. Prompts including requests for second keyed DTMF inputs may occur at other particular times or for other particular reasons, all at the discretion of an ICS provider or law enforcement or confinement institution official or agent.

Analyses of the second received signal will typically include analyses that have been performed with respect to the first received DTMF signal. Other analyses of received second signals may also be performed. In one aspect of illustrative embodiments, the characteristics of the one or more received second signals derived from the analysis are compared with corresponding ones of these characteristics in the received first signals. The degree to which one or more values for like characteristics of the first and second signals demonstrate a predetermined degree of similarity proves useful in verifying that 3-way call activity has not resulted in the inclusion of an unauthorized party. That is, if the results of analysis of the first and second received signals yields a high degree of similarity, and if no other information to the contrary exists, then it may reasonably be determined that the connection to the called party has remained as it was at the time that the call was accepted by the called party, and that no different or additional party has been substituted or added to the call.

In particular cases more than one first signal may also be used in supplying signal characteristic (or other) information for later comparison with one or more second signals present during a current inmate call. Thus, for example, first signal characteristics and/or one or more second signal characteristics from prior calls originating at a given confinement institution directed to a particular called party station may be stored in a table or database in the ICS system infrastructure for use in a comparison performed for a current call. It also proves advantageous in verifying the degree of similarity of first and second signals to include in stored first or second signals a time and date indication to compensate for differences due to seasonal or daily weather variations (including temperature variations) that can affect particular first or second signal characteristics. Any such compensation for these and other variations is advantageously accomplished by weights or allowances prior to comparison. In other aspects, these date and time characteristics can be replaced by, or augmented by, express values for weather or other environmental conditions, including sun spot activity.

Any one or more of a variety of ICS provider actions are advantageously pursued upon detection of a failure to find a satisfactory comparison between measured characteristics of first and second signals (a perceived anomaly). Importantly, a perceived anomaly may be the result of signal conditions, including concurrent speech, inserted noise from weather conditions or other some other externality. Accordingly, in accordance with another aspect of embodiments of the present invention, such an anomaly can give rise to a one or more additional prompts issued by an ICS system requesting an additional second keyed digit sequence to be entered, or special note of the anomaly can be used to alert ICS provider personnel or law enforcement or confinement institution officials of suspected 3-way call activity. Or, the particular call can be flagged for offline analysis or detailed monitoring. Offline review for detecting possible recurring calling patterns may also prove useful. One or more additional prompts requesting the entry of one or more additional keyed sequences to generate second DTMF signals may be identical to earlier requests, or may include different particular digits and/or a different number of digits. An instance where a request might be repeated is one in which an error was made in keying a requested keyed digit sequence.

In accordance with another aspect of the present invention, the results of the comparison between first and second signal characteristics may be inconclusive. In such cases, or if second or additional iterations of the comparisons, using repeated or different received second signals, does not change the inconclusive nature of the comparisons, the results are nevertheless useful and consistent with the goals of inhibiting 3-way calling. Thus, in one aspect, the mere occurrence of the request for second signals makes clear to the calling and called parties that the ICS provider is actively monitoring the bridged call to the authorized called party.

In another aspect results of comparisons of characteristics of first and second received DTMF signals, even if not conclusive, may be useful for use by other ICS system elements and methods, e.g., those described in incorporated patent application 7. Teachings of incorporated patent application 7 when used in combination with the present inventive teachings provide an effective response to perceived anomalies, while avoiding unnecessary false positive determinations of 3-way calling attempts and resulting unnecessary inconvenience and expense to calling inmates and their families and other authorized called parties. This result obtains with no compromise of institutional controls seeking to avoid or inhibit unauthorized 3-way calling.

It will be recognized that the one or more first DTMF signals described above act as a baseline or reference against which the one or more second signals can be compared, in some cases with the first and/or second signals weighted by extrinsic factors such as date/time or available environmental information.

As used in this application, a 3-way call event is one that is triggered by some timing or signal condition that is not inconsistent with a possible 3-way call attempt. Such 3-way call event may include detection of one or more unsolicited DTMF digits, i.e., those that are not requested by an ICS system prompt, or by a protracted (predetermined) period of silence, or by the detection of one or more signals, such as a hook-flash signal or certain call progress tones that are associated with an attempt to set up a 3-way or conference call. However, 3-way events may be also include the passage of a predetermined period of time, independent of current behavior by the called party. A 3-way call event may even be random, i.e., the result of an output from a random number or sequence generator. Some calls will not be subject to all of the possible 3-way call events, e.g., if there has been no evidence of an actual 3-way call attempt over an extended period of time. In those cases, such as extended speech silence or passage of a predetermined period of time, the actual periods may vary over time to reflect call behavior of the called party. Thus, if suspicious activity (perceived anomalies) have not been detected over an extended period of time, these time periods may be longer than if recurring perceived anomalies occur with high frequency.

BRIEF DESCRIPTION OF THE DRAWING

These and other advantages of illustrative embodiments of the present invention will be apparent to those skilled in the art by reference to the following detailed description and the accompanying drawing figures, in which.

DETAILED DESCRIPTION

Figure 1:
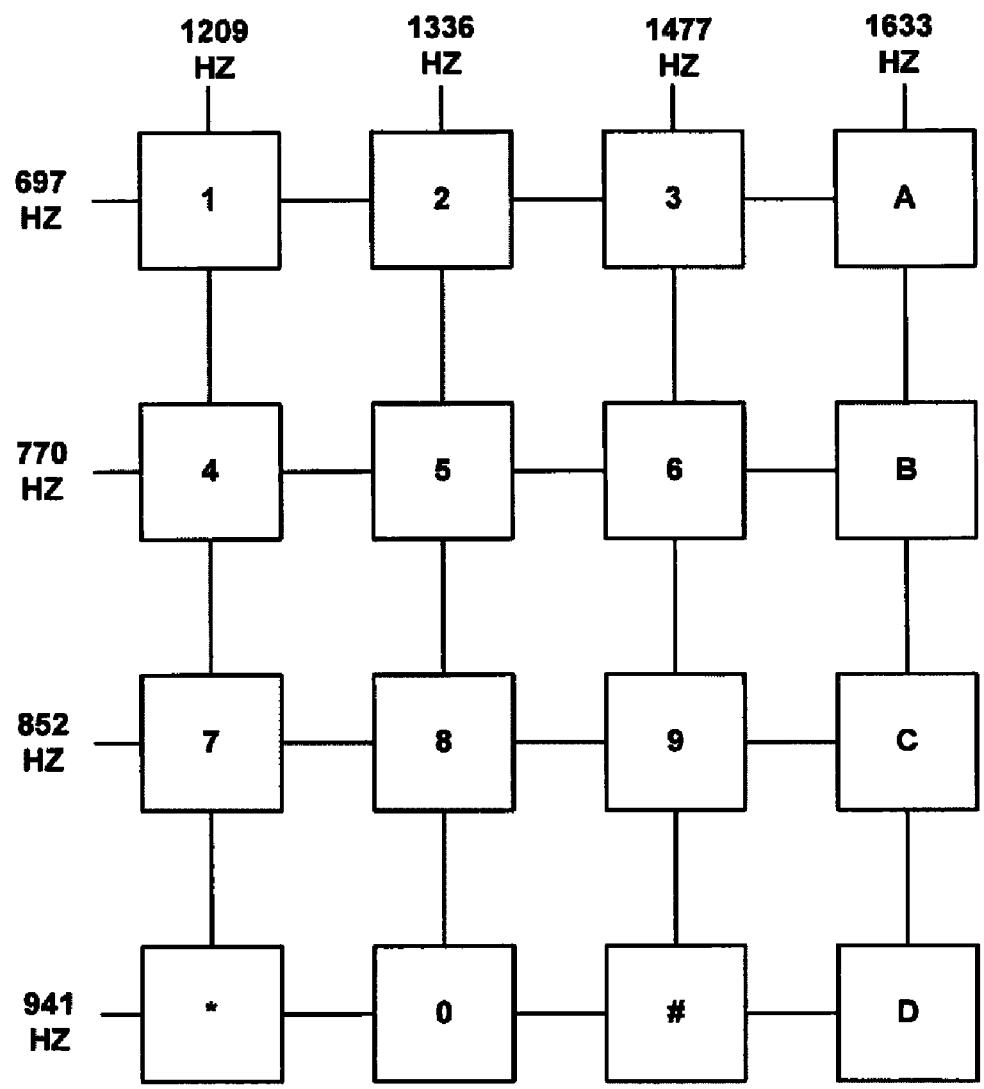
FIG. 1 is a representation of the standard 16-key DTMF keypad with associated high and low frequencies for signals generated by the depressing of each key.

FIG. 1 is a representation of the standard 16-key DTMF keypad with associated high and low frequencies for signals generated by the depressing of each key. In common usage only the left-most three rows of the 16-key keypad are used for normal telephone calling in many countries, including the United States. The '*' and '#' keys are normally not used to dial telephone numbers, but rather are used for a variety of control functions.

The international telephone standards organization known as the ITU-T (International Telecommunications Union—Telephony) has issue so-called recommendations that are followed widely around the world. These standards are known as Q.23, *Technical Features of Push-Button Telephone Sets*, and G.224, *Maximum Permissible Value for the Absolute Power Level (Power referred to One Milliwatt) of a Signalling Pulse*). Q.23 specifies the frequencies to be used and the tolerances for deviation from nominal frequencies and for allowed distortion. From this, it will be understood that some variation in these quantities is allowed in light of real world conditions to be encountered. Such variations prove useful in embodiments of the present invention when real world signals are encountered.

Figure 2:
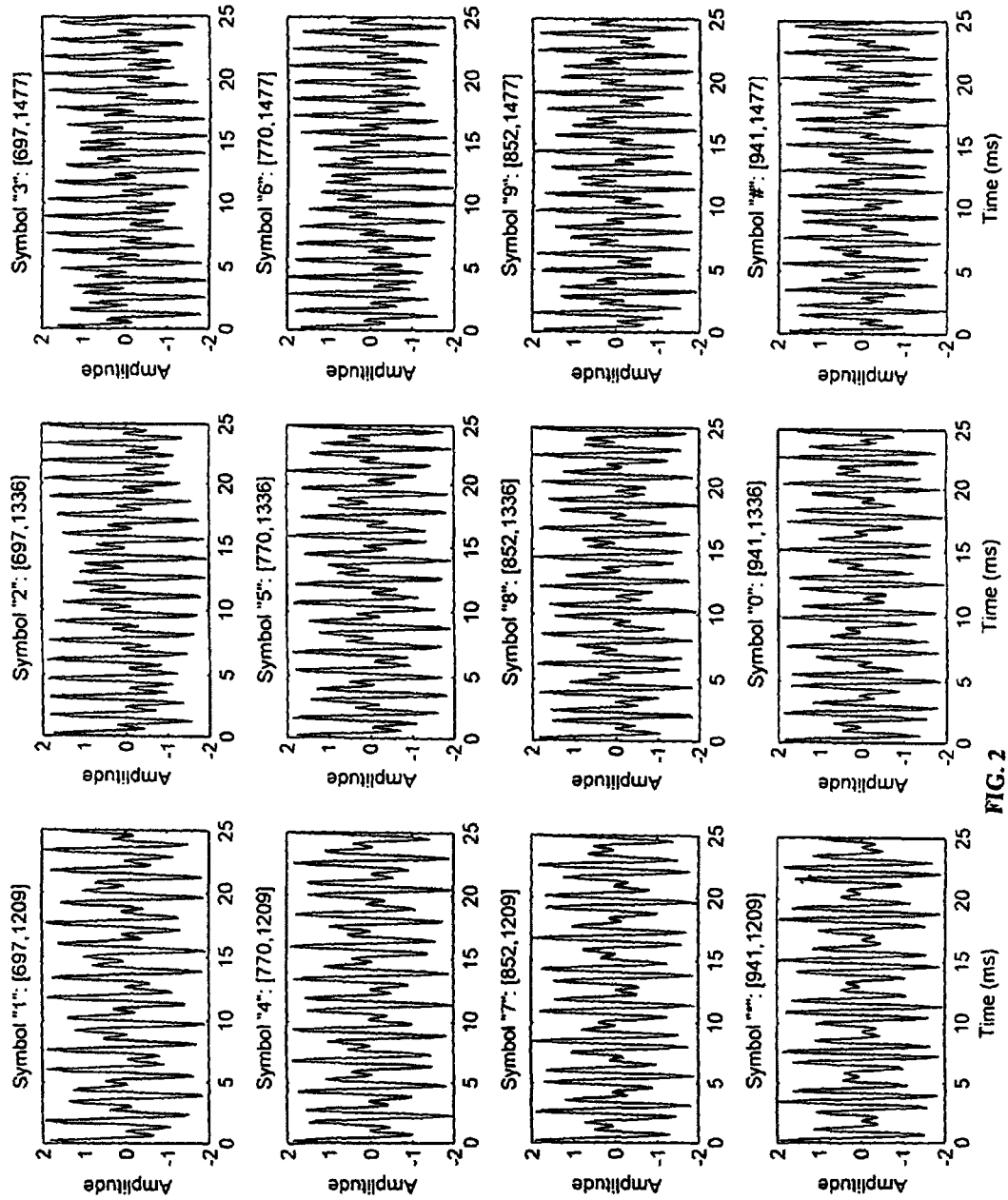
FIG. 2 is a representation of an idealized set of dual-tone signals for each of the frequency combinations shown in FIG. 1.

FIG. 2 is a representation of an idealized set of dual-tone signals for each of the frequency combinations shown in FIG. 1. No distortion is present in these idealized signals.

Figure 3:
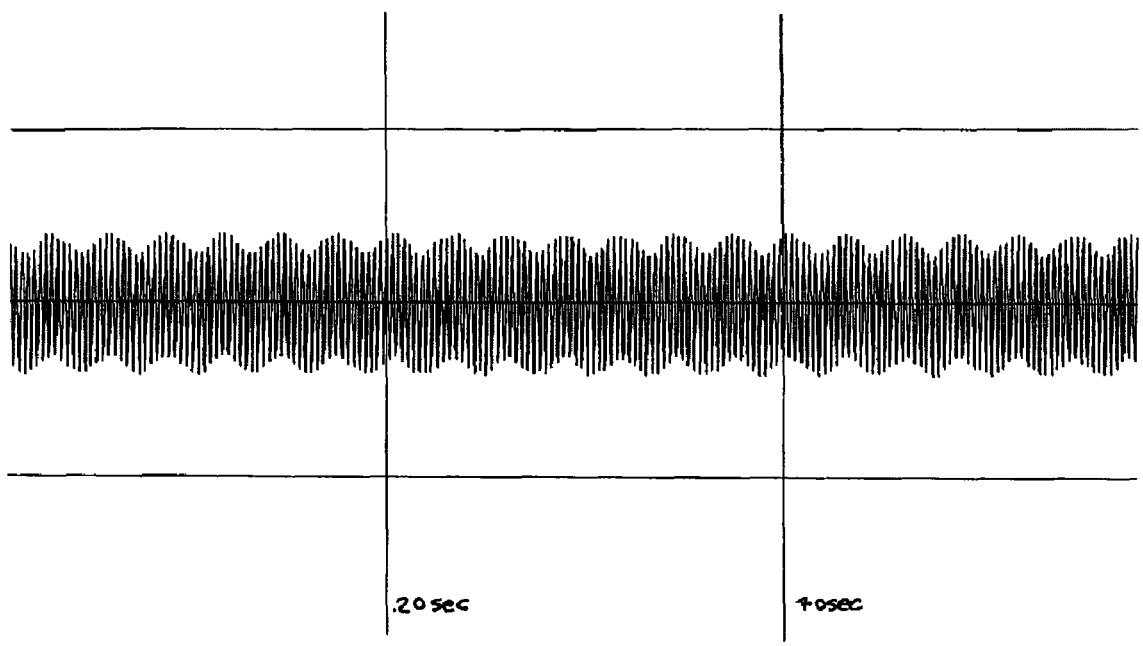
FIG. 3 shows an illustrative waveform for a single DTMF signal as it might be transmitted over a network link to a location such as a switching office or an ICS provider's monitoring location connected to a calling and a called party.

FIG. 3 shows an illustrative waveform for a single DTMF signal as it might be transmitted over a network link to a location such as a switching office or an ICS provider's monitoring location connected to a calling and a called party. Little is shown of the distortions that might be encountered by this signal during transit through a telephone network.

Figure 4:
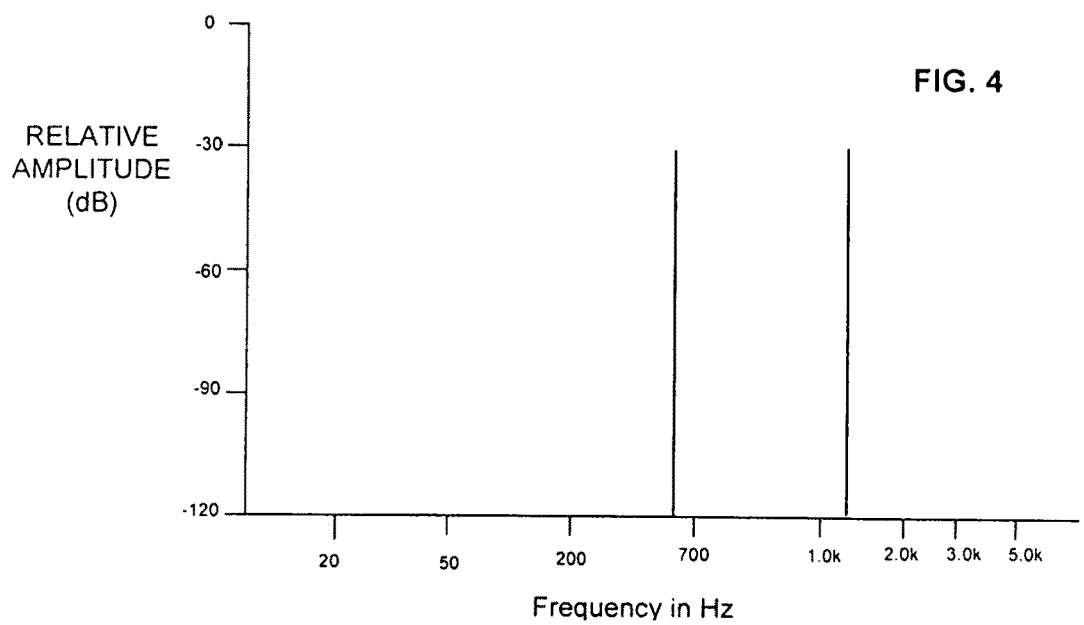
FIG. 4 is a frequency domain representation of a waveform corresponding to one of the idealized waveforms of FIG. 2.

FIG. 4 is a frequency domain representation of a waveform corresponding to one of the idealized waveforms of FIG. 2. The illustrative tone pair chosen is that corresponding to a dialed '3' digit. It should be understood that a dialed digit is one for which the corresponding key has been pressed. It will be noted that two very narrow spike-like amplitudes are displayed in FIG. 4, each closely corresponding to one of the standard frequencies for a dialed 3, i.e., 697 Hz and 1477 Hz. Further, each of the spikes is shown as having approximately the same amplitude, with signal components at other frequencies being non-existent. Again, this is not always possible over all real-world networks.

Figure 5:
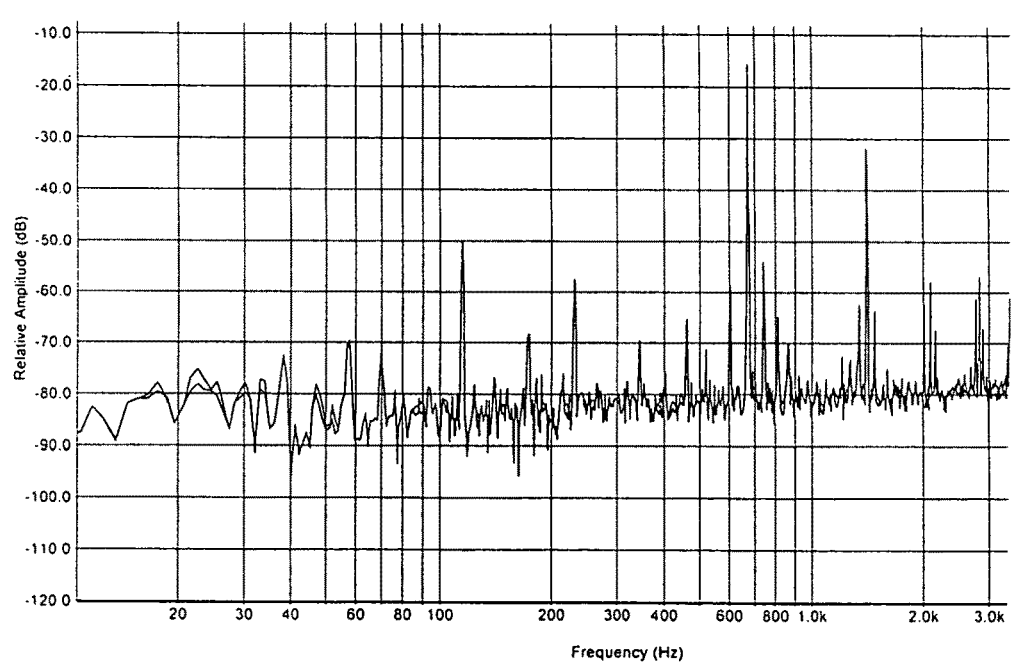
FIG. 5 is a representative frequency domain representation of a waveform corresponding to the signal of FIG. 3 as received at an ICS provider's monitoring location over a channel with impairments.

FIG. 5 is a representative frequency domain representation of a waveform corresponding to the signal of FIG. 3 as received at an ICS provider's monitoring location over a channel with impairments. As will be seen in FIG. 5 the frequency components are quite different from those in FIG. 4. However, the peak amplitudes are again found at or near the desired frequencies of 697 Hz and 1477 Hz. However, the amplitudes for these peak values are not the same, or even very close. These amplitudes are still sufficiently higher than the remaining frequency components so that the correct dialed digit can be determined. In practice, the spurious signals (those other than those in the band from the lowest of the low band (697 Hz) and the highest of the high band, (1633 Hz) can be significantly reduced through appropriate filtering well known in the art.

The signal information in FIG. 5 provides indications of the relative amplitudes of the two frequencies, a measure known popularly as twist. This term, twist, refers to the difference, in decibels (dB), between the amplitude of the strongest key pad column tone and the amplitude of the strongest key pad row tone. Industry standards provide acceptable ranges for twist that must be tolerated by decoders for received DTMF signals. Specifically, an AT&T standard requires that twist be between −8 and +4 decibels. Other standards, provisions relate to allowed signal-to-noise ratio (SNR) and to duration of each tone pulse. In particular, according to one standards provision, if a tone pulse is greater than 40 msec, then it must be decoded to satisfy the standard, other factors being within limits. Often, it is possible for a decoder to recognize a given digit when some of these standards are not completely satisfied.

Factors such as a measured value for twist, SNR or duration can be useful in connection with the present invention in determining the presence of an anomaly. However, it should be recognized that for purposes of the present invention, the received values for twist, SNR, pulse duration, and other forms of distortion or impairment in a single instance are not the primary vehicle for evaluation signals FIG. 6 shows an overall network configuration for practicing illustrative embodiments of the present invention.

Figure 6:
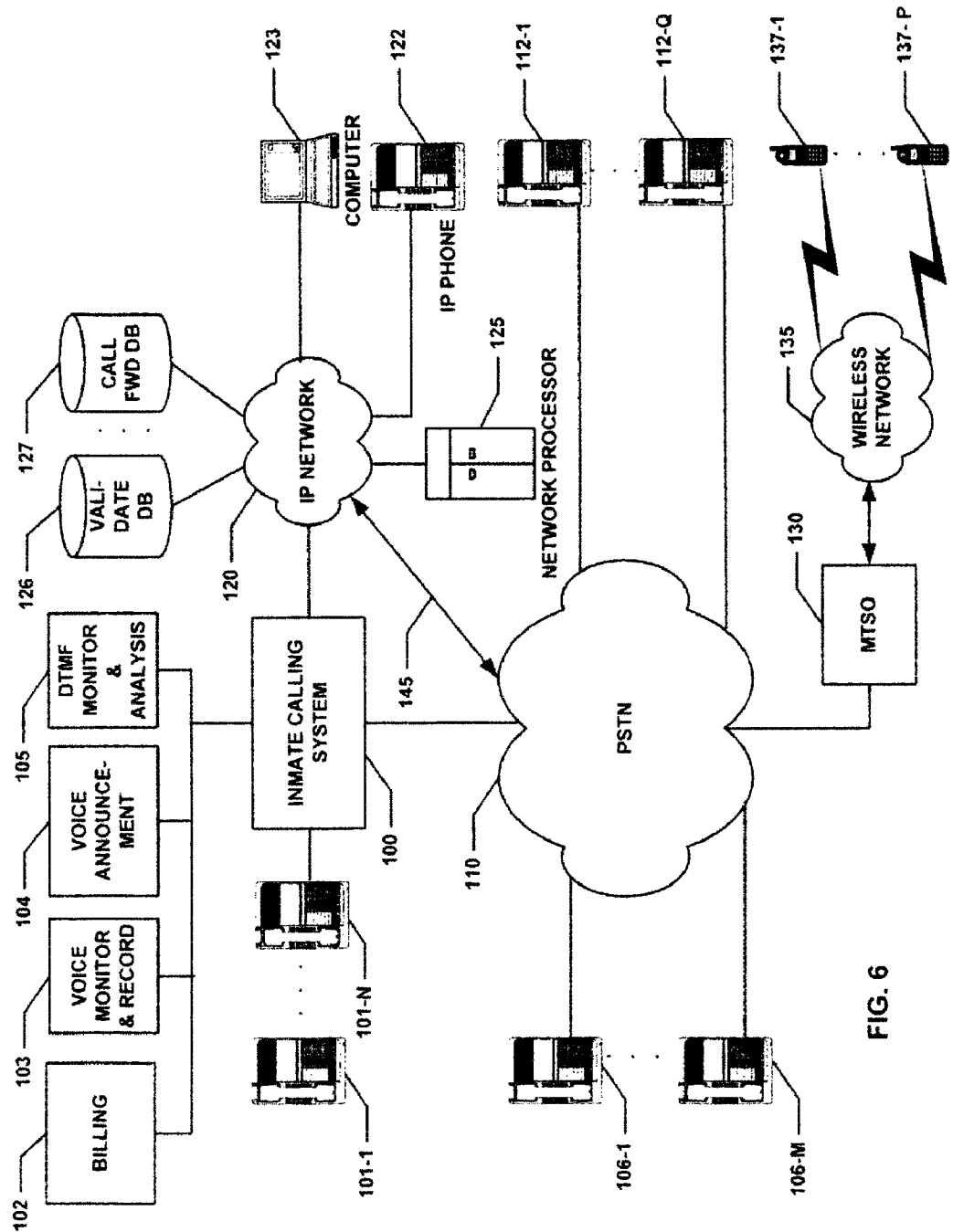
FIG. 6 shows an overall network configuration for practicing illustrative embodiments of the present invention.

As shown in FIG. 6, a plurality of telephones 101-$i$, i=1, . . . , N are shown connected to an Inmate Calling System (ICS) 100. The telephones 101-$i$ are illustratively within and under the control of a correctional institution and its officials. ICS system 100 is designed and configured to place telephone calls to authorized telephone stations 106-$j$, j=1, . . . , M over the Public Switched Telephone Network (PSTN) 110.

Also shown in FIG. 6 connected to ICS system 100 through PSTN 110 are a plurality of unauthorized telephone stations 112-$k$, k=1, . . . , Q. These stations 112-$k$ are those that have not been authorized by the correctional institution as stations to which particular inmates (or all inmates) may place telephone calls. Mobile telephone stations 137-$l$, l=1, . . . , P are telephone stations connected to ICS system 100 through PSTN 110 and mobile telephone control and interconnection facilities represented by Mobile Telephone Switching Office (MTSO) 130, which mobile stations may or may not be authorized (by correctional officials) to receive calls, but which ICS providers may choose not to allow delivery of calls to because of difficulties in billing or otherwise. ICS System 100 is shown also shown connected through to an IP network 120, which may be a public or private network employing the Internet Protocol or other packet communication protocol. IP network 120, in turn, is shown connected to a representative computer 123, and IP telephone 122, network processor 125, validation database system 126 and call forwarding database system 127. Examples of each of the above-noted system elements are well known in the art. Many of these are described in pending U.S. patent application Ser. No. 11/219, 564 filed Sep. 2, 2005 by some of the present applicants, which application is hereby incorporated by reference herein.

While ICS system 100 will illustratively be described in terms of connecting illustrative analog telephone stations 101-$i$ to PSTN for connection to analog telephone stations such as 106-$j$, it will be understood that the inventive principles of the present invention can be applied in networks involving mobile telephone stations and networks, as well as IP telephones and other IP devices and networks. For example, IP telephone 122 includes a packet coder-decoder (codec) arranged for coding and transmitting packets to IP network 120, as well as receiving and decoding IP packets from IP network 120. Network 120, in turn, includes gateway facilities (to the extent not provided by ICS system 100) to allow analog stations 101-$i$ to communicate packets to IP phone 122 via ICS system 100. Such arrangements are described in detail in the above-incorporated U.S. patent application.

Links 145 in FIG. 6 represent alternative call completion paths between calling stations 101-$i$ and authorized analog called stations such as 106-$j$. Thus, in addition to routing and completing analog calls directly from ICS system 100 through PSTN 110 to a station 106-$j$, it will prove advantageous in some cases to implement voice coding and packetizing in ICS 100 for routing through IP network 120 before linking the call via links 145 to PSTN 110 for completion to a station 106-$j$. In so processing voice signals in packet form for at least part of the call path, techniques well known in the voice-over-IP (VoIP) realm will thus be employed. Accordingly, well known gateway facilities are provided for interfacing links 145 between IP network 120 and PSTN 110. Aspects of these and related call completion and other VoIP capabilities are described in incorporated pending U.S. patent application Ser. No. 11/219,564. It will be recognized that voice signals from stations 106-$j$ will be converted into packets in like manner for transmission through gateway facilities and IP network 120 to ICS 100 for depacketing and decoding before delivery to a station 101-$i$. In like manner DTMF signals generated at the stations 106-$j$ will also be coded and packetized at gateway facilities before being routed by IP network 120 to ICS 100 for analyses in DTMF monitor and analysis unit 105 in FIG. 6, as will be described in greater detail below.

IP network 120 is also shown connected to illustrative validation database 126 and illustrative call forwarding database 127. As will be described in more detail below, validate database 126 provides well-known validation of called destination numbers to which calls from inmates are requested over telephone stations 101-*i*. Likewise, call forwarding database 127 includes certain call forwarding information for requested destination stations. Databases 126 and 127 will, in appropriate cases, be combined—or each (or combinations of both) may be structured as a plurality of distributed databases connected over a data network, such as illustrative IP network 120. It should be understood that network 120 and its interfaces to other network elements may be configured in accordance with any of a plurality of network protocols.

Also shown connected to ICS system 100 in FIG. 6 are billing unit 102, voice monitor and record unit 103, voice announcement unit 104 and DTMF monitor and analysis unit 105 (hereinafter DTMF unit 105). These units 102 through 105 are shown separate from ICS system 100 for purposes of individual emphasis only. In practice, these units 102 through 105 advantageously form part of ICS system 100, or may otherwise be linked to ICS system 100.

Billing unit 102 performs the well-known tasks associated with the creation of call detail records, CDRs, and with the rating of calls in preparation of bills for presentation to billed parties. As noted, the most common mode of billing of inmate calls is collect call billing to the called party account. One aspect of some embodiments of the present invention that deviates from normal practice in billing for inmate calls is that provision is made for selectively pausing or suspending the accumulation of call timing to provide for periods during which certain voice announcements are made and DTMF signals keyed by a party to the call. In particular, it proves advantageous to suspend the accumulation of billed time for a call while soliciting and analyzing second DTMF signals by the ICS system 100, so that a billed party is not charged for call time during which the connection will not be available for communication between a calling inmate and an authorized called party.

Voice monitor and record unit 103 shown in FIG. 6 performs the now well known functions of providing an audio feed of signals present on a connection between an inmate and a called party, and for recording such signals. Generally, as noted above, ICS providers are required to record conversations being carried over connections established by the ICS provider, including call setup transactions with caller identification and authentication (as by recording entered PIN information), called party identification and call charge acceptance.

Voice announcement unit 104 in FIG. 6 can be any of many widely available announcement systems capable of storing and delivering a plurality of standard or special purpose voice messages or prompts. Typical of a first prompt suitable for delivery to a calling inmate is: "Please enter your identification and PIN number," followed after authentication of the caller by "Please enter the number of the party you wish to call." Upon detecting an answer at a called party station number, a first prompt to the answering party will illustratively be: "This is a collect call from (name of calling party) who is an inmate at (Confinement Institution Name). This call is subject to monitoring and recording. If you agree to accept charges for this call, please press the 3 key on your telephone keypad." Actual language will vary with circumstances and requirements of the confinement institution.

Other voice announcements, including some especially adapted for use with embodiments of the present invention. For example, these voice announcements will advantageously include one to this effect: "To continue this call please press 3 on your telephone keypad NOW!" This will be recognized in light of the foregoing description as an announcement soliciting the depression of the 3 key to provide a second signal for comparison with the earlier call acceptance first signal. In addition, it will prove useful in dealing with a situation in which no response is received within some period, say ten seconds, to the preceding voice message to follow up with: "We failed to receive a response to our last request to press the 3 key on your telephone keypad. If no response is received this call will be terminated in ten seconds from NOW!" Other voice messages suitable for different particular contexts, as, for example with a repeat non-responder, to provide different particular language, allowed timing, or requirements to call an ICS provider toll-free number. Of course these messages or variants can be repeated, verbatim or with alternative language, any number of times. As noted above, the billing unit will take cognizance of the voice message and response periods and pause or otherwise adjust billed-for periods to reflect the unavailability of a connection, at least when appropriate and expected responses are provided.

While the timing for an initial voice message to a called party, and the first DTMF signals is generated in response to this initial message is largely prescribed by the normal call setup processes, voice messages soliciting keypad inputs corresponding to second DTMF signals can occur at any time during an ongoing call connection between an inmate and a called party. In most cases, the called party to whom such voice message requesting keypad inputs for generating second DTMF signals is delivered will be an authorized first called party who answers the incoming collect call. In the instances in which an original call to an authorized station has been extended, conferenced, forwarded or bridged to an unauthorized telephone station (such as one or more of 112-*k* in FIG. 6), then the received message soliciting keypad inputs for generating second DTMF signals may be received by only the unauthorized called party, i.e., an unauthorized party to whom the call was extended by the original (authorized) called party by bridging, conferencing or forwarding. If the original called party remains part of the connection (as extended), then the original called party may respond with the DTMF signals generated by keypad input. Of course there may be no response to the request for keypad inputs to generate second signals.

In any of the cases relating to a call that has been extended to an unauthorized called party, any second signals that are generated will be affected by the extension of the call to the unauthorized called party. For example, if the original called party extends the call by forwarding the call and then terminates his/her participation in the connection (i.e., hangs up), then the transmission path and any transmission impairments or influences on that transmission path will be different from the original transmission path from the calling party to the authorized called party. Thus, second DTMF signals received from the keypad of any party remaining on the connection (except the muted keypad of the calling inmate) will generally be noticeably different from received first DTMF signals from the original (authorized) called party. Similarly, if the original authorized called party remains on the connection, and either that originally authorized called party or any added unauthorized party makes the requested keypad inputs, then the received second signals from the inputting party will generally differ from the first DTMF signals from the original authorized called party. When no second input signals are received by the ICS infrastructure, the absence of second signals will, of course differ from the original first DTMF signals by the original authorized called party.

DTMF monitor and analysis unit 105 in FIG. 6 represents the functions described generally above regarding DTMF monitoring and analysis of one or more instances of first and second DTMF signals. DTMF signal detection and analysis are generally well known techniques in the telecommunications field. For example, FIG. 2 described above, shows the various possible input DTMF signal waveform, i.e., the dual-tone signal, and FIG. 3 shows an example tone corresponding to a dialed '3.' The results shown in FIGS. 4 and 5 are illustratively derived using the well-known Fast Fourier Transform (FFT) frequency analysis of the waveform of FIG. 3 and FIG. 4, respectively. The results of analyses shown in FIGS. 4 and 5 may be performed using any of a variety of publicly available executable code configured for the well known MATLAB program environment.

Figure 7:
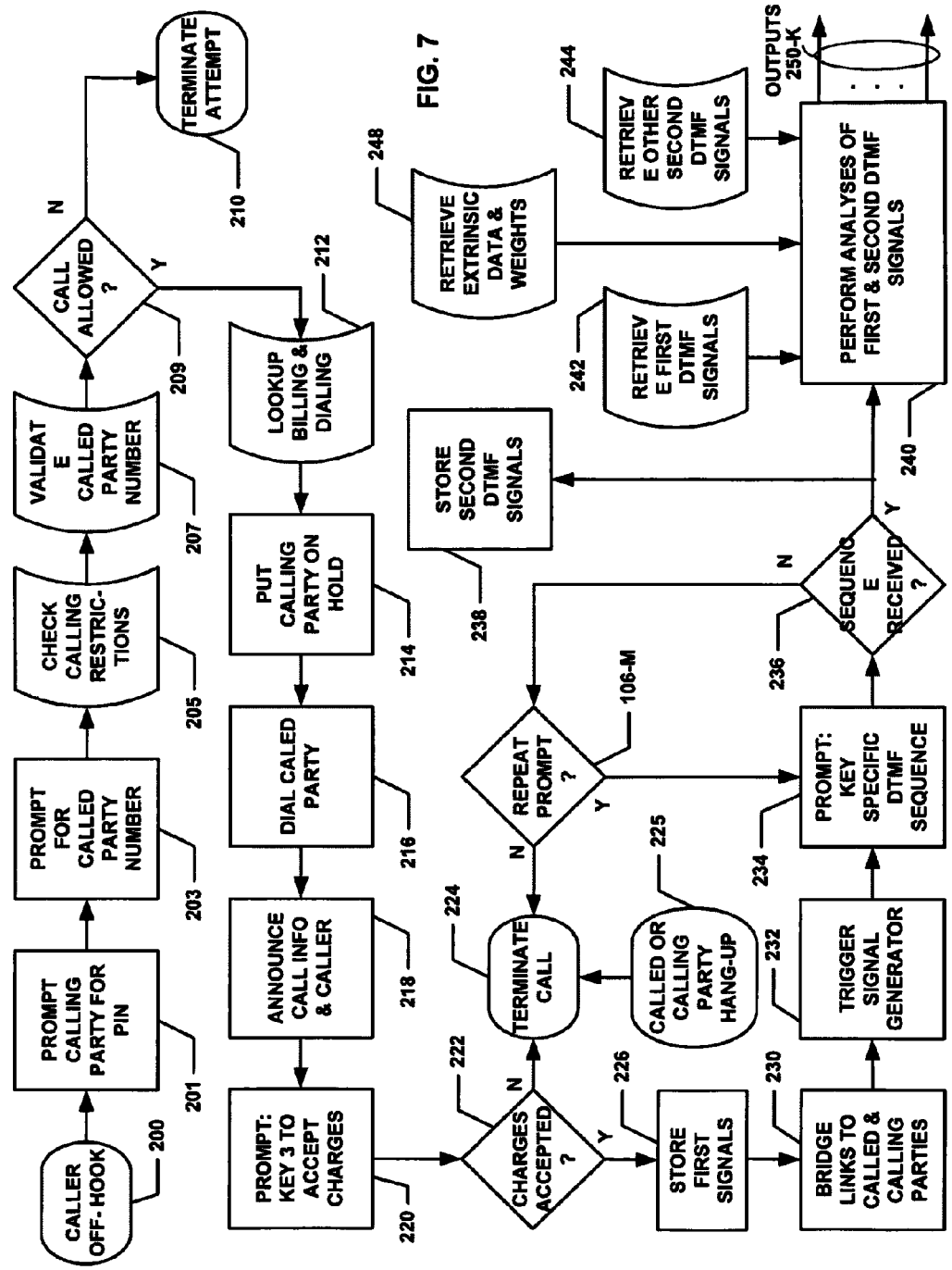
FIG. 7 is a flowchart showing operations performed in illustrative embodiments of the present invention practiced in the illustrative network of FIG. 6.

FIG. 7 summarizes the steps described above in setting up an ICS call, and storing first signals (Step 226), prompting for a specific key (illustratively the same as for call acceptance) at step 234, receiving the response to the prompt for a second signal at step 236, and analysis of the first and second signals at step 240. Outputs from step 240 may, as described above, indicate that a third party has been included in a conversation with the calling inmate, or it may be determined that no such inclusion has occurred. Frequently, however, the analysis of the comparisons of characteristics of the first and second signals is inconclusive. In such circumstances, a goal of the present invention is served by not terminating the call, i.e., not assuming the worst outcome (the attempt or completion of a 3-way call), but rather by providing an input to other elements of the ICS system, such as those described in incorporated patent application 7. The result of such hand-off to these other ICS system elements include having the current called party (if present), or a third party (if that party is present) terminated the call. Note that in such circumstances it is not the ICS provider that terminates the call, but a called party. Then, the call is advantageously replaced by a new call (a continued call) to the original called party and the calling party is again joined to the bridge with the authorized called party. This use of the present invention provides for protection for the confinement institution and does not penalize the called party just for the possibility that a 3-way call was attempted. Of course, if a 3-way call had been placed, then it has been terminated with notice that the continued call is being monitored carefully.

In implementing the required analysis routines in DTMF Monitor & Analysis unit 105 in FIG. 6, any of a number of other software, circuit or circuit-on-a-chip implementations of DTMF detectors can be used to generate waveforms of the type shown in FIGS. 4 and 5. In any event, a number of Fourier coefficients are generated that correspond to amplitudes at the respective component frequencies, all of which is well known in the art.

From the Fourier coefficients, and various analyses of dominant frequency components and spurious (noise, interference and other distortion), such quantities as SNR, and, of course, twist, can readily be determined.

An early DTMF detector is described in U.S. Pat. No. 3,140,357 to Bischof, et al. In this patent incoming telephone line signals are initially filtered into high frequency and low frequency bands and, within each such band filters are used to separate signal components at each individual frequency characteristic of a valid DTMF signal. This patent identifies the desired conditions for generating a detected digit using such DTMF signals: (i) a signal component at a valid frequency is detected in each band, (ii) each frequency is present for at least a predetermined period of time, and (iii) only one valid signal component is present in each band.

U.S. Pat. No. 3,780,230 to Bowen et al. also separate incoming DTMF signals into high and low frequency bands, but also detect signal content at frequencies between the high and low bands of sufficient amplitude that false indications of the presence of a valid frequency pair can be indicated. Amplitudes of the various signals is determined using a frequency-to-voltage converter and comparison of the converter output voltage with a number of threshold signals. Thus, both in-band (high and low) and between band signal levels are determined.

U.S. Pat. No. 3,795,775 to Cowpland adopts many of the same features of other DTMF detectors, but also avoids certain filter complexities by exploiting the ratio of amplitude of a DTMF component in one band, say the high frequency band, to that of the component in the other (low frequency) band. Differences between amplitudes in the two bands is attributed to characteristics of the transmission line from which the DTMF signals arrive.

U.S. Pat. No. 5,257,309 teaches detection and identification of DTMF signal pulses by subjecting the signal being analyzed to complex bandpass filtering for each of the two DTMF frequency bands. The envelope of the outputs of each of these filters are determined and subjected to a succession of different tests including a ripple or smoothness test to ensure adequate smoothness, a ratio test to ensure the occurrence of a step function, a twist test to ensure the proper amplitude ratio between the two bands, and a minimum energy test to ensure that the signal has sufficient energy. If the signal passes all of the detection tests, then the actual DTMF signal is identified by using the real and imaginary parts of each complex bandpass filter output to compute an associated complex phase angle, and comparing that phase angle to the corresponding phase angles for valid DTMF tones.

U.S. Pat. No. 5,117,369 discloses a DTMF detector that uses a frequency shift delay detection circuit and employs phase-related operations on intermediate signals to permit detection of phase differences at the output of a vector calculation circuit.

U.S. Pat. No. 5,588,053 provides DTMF detection using static and dynamic thresholding.

U.S. Pat. No. 5,694,466 provides DTMF detection using a particular twist calculation relating to frequencies in both high and low bands and a variant thresholding approach.

U.S. Pat. No. 6,560,331 discloses a method and system for facilitating the detection of DTMF tones. The method is based on detecting two tones using a modified nonuniform discrete Fourier transform that includes a phase correction term for each DTMF tone and harmonic. The disclosed method is employed by a DTMF detector that includes a sampling module, a computation module, an analysis module, and a decode module. The sampling module samples an input signal from a communication network at a rate sufficient to avoid data loss. The sample signal is then placed through a modified DFT which is more precise than filters or analog devices, particularly those utilizing a Goertzel algorithm. The computation module implements a fast recursive algorithm for completing the necessary computations. The analysis module checks for the present of energy level peaks at the DTMF tones and their harmonics. Once a DTMF signal is verified to contain a DTMF tone, the decode module transmits the, number, letter, or symbol to an interface.

U.S. Pat. No. 6,782,095 teaches the use of the Discrete Fourier Transform (DFT) on small time windows and providing phase continuity between these windows, with the results of the successive DFTs being combined and processed by a second DFT computation. This second DFT allows higher frequency resolution without requiring the re-computation of the DFT from the time samples. The resulting effect is a tone receiver with both high time and frequency resolution which consequently leads to robust and accurate tone recognition systems conforming even to the most stringent specification while maintaining low computational requirements.

U.S. Pat. No. 7,082,143 discloses a method and system for detecting a DTMF digit by separating the composite signal into its first and second components, estimating power of the separated first and second components, determining frequency of the separated first and second components, and comparing the power and frequency of the first and second components to at least one of a plurality of respective power and frequency thresholds to determine whether the composite signal comprises a dual tone. The DTMF signals can be present in voice packets in a voice packet network.

U.S. Pat. No. 7,184,542 discloses a software-based approach to DTMF detection.

U.S. Pat. No. 7,180,792 discloses a signal processing system that discriminates between voice signals and data signals modulated by a voiceband carrier. The signal processing system includes a voice exchange, a data exchange and a call discriminator. The voice exchange is capable of exchanging voice signals between a switched circuit network and a packet based network. The signal processing system also includes a data exchange capable of exchanging data signals modulated by a voiceband carrier on the switched circuit network with unmodulated data signal packets on the packet based network. The data exchange is performed by demodulating data signals from the switched circuit network for transmission on the packet based network, and modulating data signal packets from the packet based network for transmission on the switched circuit network. The call discriminator is used to selectively enable the voice exchange and data exchange.

U.S. Patent Application 20030235292A1 discloses a hardware and software-based DTMF detector.

Each of the above-cited U.S. patents and patent applications is hereby incorporated by reference as if set forth in its entirety in this application. Techniques disclosed in these incorporated documents provide examples of analyses or processing steps that can be applied, alone or in combination with each other or with other techniques, to first DTMF signals and second DTMF signals described in this application. It will be noted that detecting particular digits or sequences of digits present in such first and second DTMF signals is not the primary object of embodiments of the present invention. Rather, selected characteristics of such first and second DTMF signals, or characteristics of derived results, e.g. phase information, relative amplitudes, and other characteristics involved in DTMF detection in the incorporated references, form the basis for comparisons between first and second DTMF signals. While verifying that one or more requested DTMF digits has been received (detection of a requested DTMF signal sequence) will generally be used in embodiments of the present invention, such detection may be accomplished separately from comparisons of the first and second DTMF signal characteristics being compared.

While first signals from a call currently being set up are described above, it will prove useful in some illustrative embodiments to use previously stored characteristics determined in prior analyses of first DTMF signals from prior call setup operations. Such results of analyses of prior first DTMF signals are conveniently stored in a database shown in FIG. 6 as validate database 126 that has as a primary function the storage of Line Information data for potential called parties. In other cases, a separate database will be used for storing characteristics determined in DTMF signal analyses of prior first (and/or second) DTMF signals. Further, such prior call setup analyses can be used in addition to or as part of an analyses involving a current first DTMF signal and/or a current second DTMF signal.

In effectively applying weights or adjustments to reflect differing environmental or other conditions, it will sometimes prove useful to apply results from a prior analysis of a second DTMF signal from a time when the same, or similar, conditions prevailed. Thus, for example, characteristics determined currently will be compared with the same characteristics determined on a prior occasion for a call to the same destination as the current call that was placed in a particular season.

The foregoing detailed description is to be understood as being in every respect illustrative and exemplary, but not restrictive, and the scope of the invention disclosed herein is not to be determined only from the detailed description of illustrative embodiments but according to the full breadth permitted by the patent laws. It is to be understood that the embodiments shown and described herein are only illustrative of the principles of the present invention and that various modifications may be implemented by those skilled in the art without departing from the scope and spirit of the invention.

While the above description of illustrative embodiments of the present invention have provided for weighing measured or otherwise determined first or second DTMF signal characteristics for weather or other pervasive, but variable, environmental factors, other known or measurable effects may also be taken into account. Thus, for example, if particular trunks or other links in a connection exhibit particular transmission performance, it will prove useful in some cases to adjust amplitude, phase, noise or frequency characteristics of received DTMF signals to compensate for such link performance as compared with other such facilities employed at a prior time for calls between the same authorized locations.

What is claimed is:

1. A method for determining the likelihood that a called party to whom a first telephone connection has been established has modified that first connection, the method comprising upon placing a call establishing the first connection to said called party at a known telephone terminal having a known terminal address, requiring the called party to apply a first signal to a telephone channel, said first signal having characteristics that can be measured after being communicated over a telephone channel, storing said first signal as received from said telephone channel, subsequent to receiving said first signal, requiring the called party to apply a second signal to said telephone channel in the same manner as for the first signal, and comparing said second signal as received from said telephone channel with said stored first signal.

2. The method of claim 1 wherein said known terminal having a known address is a terminal associated with a network address.

3. The method of claim 2 wherein said network address is a telephone number.

4. The method of claim 1 wherein determining the likelihood that said called party has modified said first connection comprises determining the likelihood that said called party has bridged said call to include at least one additional party at a different terminal having a different terminal address.

5. The method of claim 1 wherein determining the likelihood that said called party has modified said first connection comprises determining the likelihood that said called party has forwarded said call to one or more additional parties at respective different terminals having respective different terminal addresses.

6. The method of claim 1 wherein said first and second signals are dual-tone multi-frequency tone (DTMF) signals applied to said telephone channel by pressing one or more keys on a DTMF keypad.

* * * * *